United States Patent
Kyburz

[11] B 4,001,201
[45] Jan. 4, 1977

[54] PROCESS FOR CROSSLINKING HYDROPHILIC COLLOIDS USING VINYL SUBSTITUTED, SO₂ CONTAINING, AMINE SALT

[75] Inventor: Rolf Kyburz, Marly, Switzerland
[73] Assignee: Ciba-Geigy AG, Basel, Switzerland
[22] Filed: Feb. 16, 1973
[21] Appl. No.: 333,247
[44] Published under the second Trial Voluntary Protest Program on March 16, 1976 as document No. B 333,247.

[30] Foreign Application Priority Data

Feb. 25, 1972 Switzerland ............ 2722/72

[52] U.S. Cl. ............ 260/117; 526/9; 260/556 AC; 260/556 N; 96/111.
[51] Int. Cl.² ............ C09H 7/00; C08F 116/06
[58] Field of Search ............ 260/91.3 VA, 117; 96/111

[56] References Cited

UNITED STATES PATENTS

| | | | |
|---|---|---|---|
| 2,579,871 | 12/1951 | Schoene | 260/117 X |
| 2,994,611 | 8/1961 | Heyna et al. | 260/117 X |
| 3,061,436 | 10/1962 | Himmelman et al. | 260/117 X |
| 3,455,892 | 7/1969 | Froehlich | 260/117 |
| 3,455,893 | 7/1969 | Froehlich | 260/117 |
| 3,551,159 | 12/1970 | Froehlich | 260/117 X |
| 3,642,486 | 2/1972 | Burness et al. | 260/117 X |

FOREIGN PATENTS OR APPLICATIONS

| | | | |
|---|---|---|---|
| 1,175,547 | 8/1964 | Germany | 96/111 |
| 1,953,920 | 5/1971 | Germany | |
| 994,869 | 6/1965 | United Kingdom | 96/111 |

OTHER PUBLICATIONS

Chem. Abstracts. vol. 68, 1968, 3531p, Nishio et al.

Primary Examiner—Howard E. Schain
Attorney, Agent, or Firm—Joseph G. Kolodny; Edward McC. Roberts; Prabodh I. Almaula

[57] ABSTRACT

The present invention relates to a process for crosslinking hydrophilic colloids which contain amino-, imino- and/or hydroxyl groups. Compounds of the formula

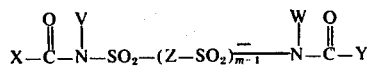

are used as crosslinking agents. In the formula V and W denote hydrogen atoms or organic radicals, X and Y represent vinyl groups or substituted vinyl groups or groups which can be converted into vinyl groups, Z represents an organic bridge member and $m$ is an integer from one to 11. The compounds used as cross-linking agents, except those of the above formula wherein X and Y represent groups which can be converted into vinyl groups, are new and form part of the invention; also forming another aspect of the invention are photographic materials containing celloids cross-linked as per the above process.

5 Claims, No Drawings

PROCESS FOR CROSSLINKING HYDROPHILIC COLLOIDS USING VINYL SUBSTITUTED, SO₂ CONTAINING, AMINE SALT

Compounds with at least two vinyl groups in the molecule, which are used as crosslinked agents for hydrophilic colloids, are already known from the literature (compare British patent specification No. 860,323). Furthermore, divinylketone and 1,3,5-triacryloyl-hexahydro-1,3,5-triazine, in addition to divinylsulphone, have been disclosed by German Auslegeschrift No. 872,153 and German Offenlegungsschrift No. 2,008,113. The industrial use of these compounds and especially of divinylsulphone is prevented by the harmful physiological properties of these compounds. Compounds which contain the atomic grouping —CO—NH—CO—CH=CH₂, —CH₂O—CO—NH—CO—CH=CH₂ or CH₂—NH—CO—NH—CO—CH=CH₂ at least twice, have also been disclosed as crosslinked agents for gelatine (compare British patent specification Nos. 1,119,306, 1,183,648 and 1,193,601, French Pat. No. 1,524,588 and German Auslegeschrift No. 1,808,683). However, the resistance to hydrolysis of colloids crosslinked with these compounds is low, so that on storing the crosslinked material at higher temperature and humidity the hardening effect is lost or at least greatly decreases. Compounds have also been disclosed which contain an acid group which confers solubility in water and at least two $\alpha,\beta$-ethylenically unsaturated $\alpha$-halogeno-carboxylic acid amide radicals and which only exert their hardening action after a post-treatment at higher temperature and higher humidity of the material treated with these compounds; but this post-treatment has an unfavourable influence on the photographic properties of the said material (compare British patent specification No. 1,115,164).

It has now been found that the abovementioned disadvantages can be avoided, surprisingly, if sulphuric acid N,N'-diacylamides or disulphonic acid N,N'-diacylamides of a certain composition are used as crosslinking agents.

The process according to the invention for cross-linking hydrophilic colloids which contain amino, imino and/or hydroxyl groups is characterised in that at least one compound of the formula

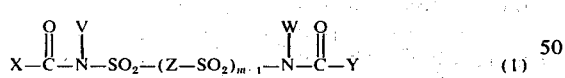   (1)

wherein V and W independently of one another denote a hydrogen atom or an organic radical, X and Y, independently of one another, denote a vinyl group which is optionally substituted further or a group which can be converted into a vinyl group, Z denotes an organic bridge member and m denotes an integer having a value of one to 11, or a salt of such a compound, is used as the crosslinking agent.

Possible organic radicals V and W are in particular aliphatic radicals, preferably alkyl radicals, which can be substituted by hydrophilic groups such as, for example, alkoxy, dialkylamino or trialkylammonium groups.

Possible cations for forming salts are, for example, alkali metal ions, especially sodium ions and potassium ions, and ammonium ions. Compounds of the formula (1) which are capable of salt formation are those in which V or W or both represent hydrogen atoms and can, as a result of the acid character of the atomic grouping, be replaced by the cations mentioned.

As vinyl groups X and Y which are optionally substituted further there should be mentioned vinyl groups which are substituted by, for example, one or more halogen atoms or alkyl and aryl radicals such as, for example, unsubstituted or substituted phenyl radicals.

Possible organic bridge members Z are divalent aliphatic or aromatic, preferably alkylene and arylene, radicals, especially polymethylene radicals and phenylene radicals, which can be substituted by hydrophilic groups such as alkoxy and alkoxyalkoxy radicals, preferably those with one to four carbon atoms per alkoxy radical, and especially by a methoxy or methoxyethoxy radical.

Possible crosslinking agents which can be used according to the invention are especially compounds of the formula

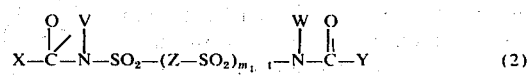   (2)

wherein V, W, X, Y and Z have the abovementioned meanings and $m_1$ is the number 1 or 2.

Compounds of particular interest are those of the formula

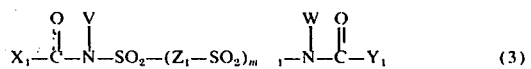   (3)

wherein V, W and $m_1$ have the abovementioned meanings and $X_1$ and $Y_1$ independently of one another denote a vinyl group, a halogeno- or lower alkylvinyl group or a group which can be converted into a vinyl group which is optionally substituted further and $Z_1$ denotes an unsubstituted or substituted aliphatic or aromatic bridge member.

Possible substituents of an ethyl group which can be converted into a vinyl group are, for example, halogen atoms such as chlorine or bromine atoms, amino, hydroxyl or trimethylammonium groups.

Compounds of particular interest as crosslinking agents are those of the formula

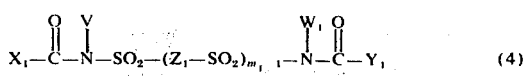   (4)

wherein $X_1$, $Y_1$, $Z_1$ and $m_1$ have the abovementioned meanings and $V_1$ and $W_1$ either both denote a hydrogen atom, or an alkyl radical with one to four carbon atoms which is unsubstituted or substituted by hydrophilic groups, or one of them denotes an alkyl radical with one to four carbon atoms which is unsubstituted or substituted by hydrophilic groups and the other denotes a hydrogen atom.

Of particular interest as crosslinking agents are compounds of the formula

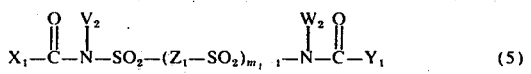   (5)

wherein $X_1$, $Y_1$, $Z_1$ and $m_1$ have the abovementioned meanings and $V_2$ and $W_2$ either both denote a methyl radical or both denote hydrogen atoms, or one of them denotes a methyl radical and the other denotes a hydrogen atom, and those of the formula

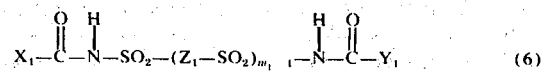 (6)

wherein $X_1$, $Y_1$, $Z_1$ and $m_1$ have the abovementioned meanings.

In a preferred embodiment of the process according to the invention, compounds of the formula

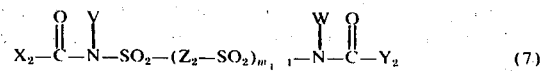 (7)

are used, wherein V, W and $m_1$ have the abovementioned meanings and $X_2$ and $Y_2$ independently of one another denote a vinyl group, an α-halogenovinyl group or group which can be converted into a vinyl group which is optionally substituted further, and $Z_2$ denotes a polymethylene or m-phenylene radical.

Possible substituents of an ethyl group $X_2$ or $Y_2$ which can be converted into a vinyl group are, for example, those which have been indicated earlier for $X_1$ and $Y_1$.

Polymethylene radicals are especially understood as —$(CH_2)_n$— radicals, wherein n denotes an integer from one to six, preferably two to four.

Advantageous results are achieved when using compounds of the formula

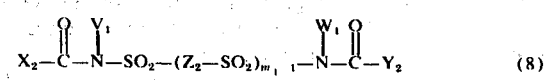 (8)

or those of the formula

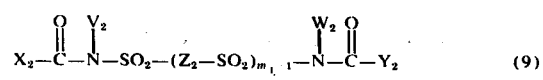 (9)

or those of the formula

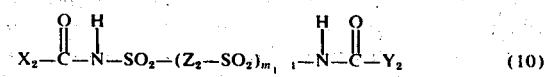 (10)

with $V_1$, $V_2$, $W_1$, $W_2$, $Z_2$ and $m_1$ in the formulae (8), (9) and (10) having the meanings indicated earlier.

In a preferred embodiment of the process according to the invention, compounds which correspond to the formulae

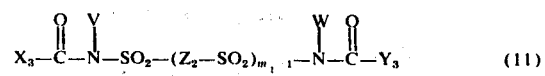 (11)

or

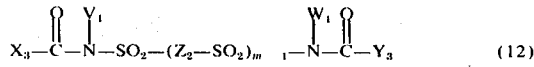 (12)

or

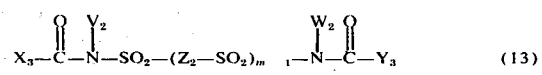 (13)

are used, wherein V, $V_1$, $V_2$, W, $W_1$, $W_2$, $Z_2$ and $m_1$ have the meanings indicated earlier and $X_3$ and $Y_3$ independently of one another denote a vinyl group or a 2-chloroethyl group.

Compounds which are particularly suitable for carrying out the process according to the invention are those of the formulae

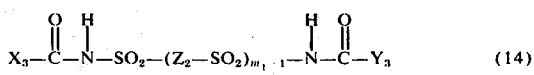 (14)

wherein $X_3$, $Y_3$, $Z_2$ and $m_1$ have the indicated meanings.

Particularly suitable compounds are those of the formula

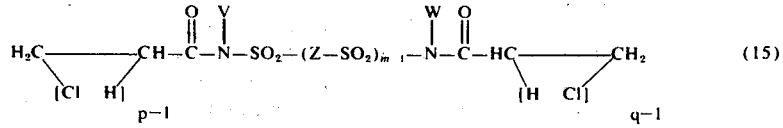 (15)

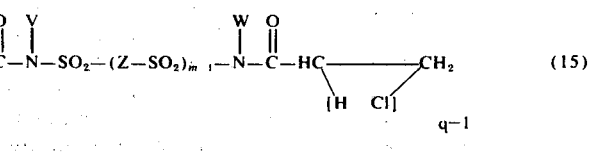 (15)

wherein V and W either both denote the same organic radical or both denote a hydrogen atom, or one of them denotes an organic radical and the other denotes a hydrogen atom, and p and q each denote an integer having a value of at most two. This in particular applies to the compound of the formula

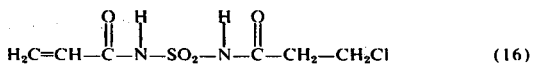 (16)

As already indicated, salts of the compounds of the formulae (1) to (16) can also be used, where compounds are concerned which contain a hydrogen atom on at least one of the two nitrogen atoms of the formula. The salts formed with one equivalent of a base, especially the salts deriving from amines, for example triethylamine, are particularly preferred.

Furthermore, those compounds of the formulae (1) to (16) and their salts prove advantageous in which the time for decomposition, at 40°C, of half the amount of the compound present in aqueous solution is at least 8 hours and preferably at least 12 hours.

The radicals

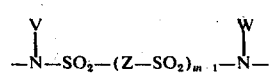

of the compounds of the formula 1 to be used according to the invention are derived, for example, from the following compounds: sulphuric acid diamide ($H_2N—SO_2—NH_2$), sulphuric acid N-amide-N'-methylamide, sulphuric acid N,N'-di-(methylamide), sulphuric acid N,N'-(phenylamide), sulphuric acid N,N'-di-(cyclohexylamide), sulphuric acid N,N'-di-(butylamide), sulphuric acid N-butylamide-N'-cyclohexylamide), sulphuric acid N,N'-di-(propylamide), sulphuric acid N,N'-di-(isopropylamide), sulphuric acid N-amide-N'-n-butylamide, methanedisulphonamide [methane-di-(sulphonic acid amide), $H_2N—O_2S—CH_2—SO_2—NH_2$], ethane-1,2-di-(sulphonamide), propane-1,3-di-(sulphonamide), benzene-1,3-di-(sulphonamide), 2-methylpropane-1,3-di-(sulphonamide), 2,2-dimethylpropane-1,3-di-(sulphonamide), -chlorobenzene-, -di-(sulphonamide), -methoxybenzene-, -di-sulphonamide), diethyl ether-2,2'-(sulphonamide), benzene-1,3-di-(sulphonic acid methylamide), toluene-2,4-di-(sulphonamide), naphthalene-1,5-di(sulphonamide), naphthalene-2,6-di-(sulphonamide), piperazine-N,N'-di-(sulphonamide), 4,5,6-trimethoxybenzene-1,3-di-(sulphonamide), 4,6-dimethoxybenzene-1,3-di-(sulphonamide), pyridine-3,5-di-(sulphonamide) and 5-nitrobenzene-1,3-di-(sulphonamide).

The radicals

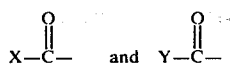

of the formula (1) are derived, for example, from the following compounds: 3-chloropropionic acid, 2,2-dichloropropionic acid, 2,3-dibromopropionic acid, 2-chloroisobutyric acid, 2-bromopropionic acid, 3-bromopropionic acid, 2,3-dichloropropionic acid, 2,3,3-trichloropropionic acid, 2,2,3,3,3-pentachloropropionic acid, 2,3-dichloro-2-bromopropionic acid, 2-bromoisovaleric acid, chloropivalic acid, acrylic acid, methacrylic acid, 2-fluoroacrylic acid, 2-chloroacrylic acid, 3-chloroacrylic acid, 2-bromoacrylic acid, 3-bromoacrylic acid, 2-cyanoacrylic acid, 2-phenylacrylic acid, 2-trichloromethylmercaptoacrylic acid, 2-chloroisobutyric acid, mucochloric acid, trichlorocrotonic acid, trichloroacrylic acid, 2,2,3,3-tetrachloropropionic acid, 2-bromobutyric acid, 2,3-dichloroisobutyric acid, 2-bromocaproic acid, 2-bromocaprylic acid, 2-hydroxypropionic acid, 3-hydroxypropionic acid, 2-hydroxybutyric acid, 3-hydroxybutyric acid, 2-hydroxyvaleric acid, 2-hydroxycaproic acid, 2-hydroxycaprylic acid, 2-aminopropionic acid, 2-aminobutyric acid, 3-aminobutyric acid, 2-aminovaleric acid, 2-aminocaproic acid and cinnamic acid.

Compounds of the formulae

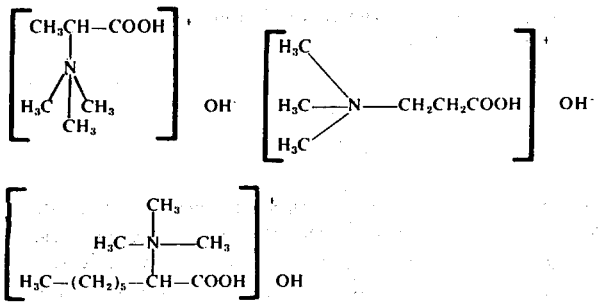

The compounds of the formula (1) to be used according to the invention are in some cases new and in some cases known. New compounds correspond to the formula

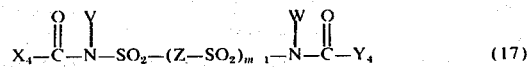

wherein V, W, Z and m have the abovementioned meanings and $X_4$ and $Y_4$ denote a vinyl group which is optionally substituted further. The compounds of the formula (17) can be manufactured in a manner which is in itself known (compare German Pat. No. 876,846; C. H. Anderson and E. F. Degering, Proc. Indiana Acad. Sci. 56, 134–135 (1946); R. Sowada, J. prakt, Chem. 26, 184 (1964); E. N. Zil'berman, A. A. Michurin and E. Sivenkov, J. Org. Chem. USSR 6, 626 (1970) and 6, 2228–2230 (1970), C. C. Chappelow and W. J. Rost, J. Pharm. Sci. 60 (4) 620–621 (1971) and DT-OS No. 1,953,520) by the action of acid halides or acid anhydrides on sulphuric acid diamides in accordance with the equation:

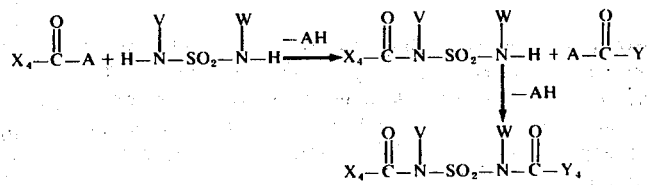

wherein A denotes a halogen atom or the radical $—O—CO—X_4$ or $—O—CO—Y_4$, or by reaction of acylated amidosulphuric acid chlorides with reactive primary and secondary amines in accordance with the equation

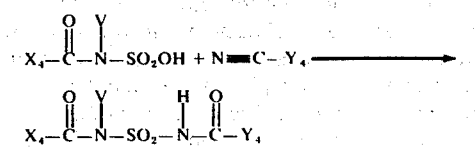

in which formulae $X_4$, $Y_4$, V and W have the abovementioned meanings.

The compounds of the formula (17), wherein $X_4$ and $Y_4$ denote the same radical can also be manufactured by reacting a compound of the formula

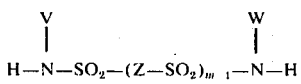

wherein V, W, Z and m have the abovementioned meanings, with at least two equivalents of an acid halide of the formula

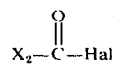

wherein $X_2$ has the abovementioned meaning and Hal denotes a halogen atom, in the presence of a Lewis acid and optionally in the presence of an inert organic solvent and, in the case where $X_2$ is a halogen-substituted organic radical, by treating the resulting product amines, in a polar organic solvent, in order to split off hydrogen halide.

In order to accelerate the reaction, the reaction mixture can be warmed up to the boiling point of the solvent used, for example of halogenated hydrocarbons such as carbon tetrachloride, methylene chloride or dichloroethane. Examples of possible Lewis acids are zinc chloride, tin tetrachloride, titanium tetrachloride, boron trifluoride, aluminum bromide, aluminium chloride, iron-III chloride or antimony pentachloride.

New compounds of the general formula

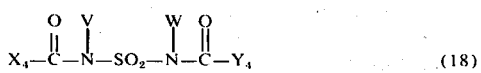 (18)

wherein V, W, $X_4$ and $Y_4$ have the abovementioned meanings, can be manufactured by treating a compound of the formula

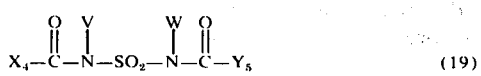 (19)

wherein V, W and $X_4$ have the abovementioned meanings and $Y_5$ denotes a halogenoethyl group which can be converted into an optionally substituted vinyl group and which can possess yet further substituents, such as alkyl or phenyl radicals, with amines in a polar organic solvent.

Hydrogen halide is preferably split off by adding an excess of an amine to the solution of the halogen compound in a polar organic solvent such as a ketone, for example acetone or ethyl methyl ketone, or an ether, for example dioxane, tetrahydrofurane or dimethoxyethane. Amines used are preferably tertiary aliphatic amines such as trimethylamine or triethylamine, but also aromatic amines such as pyridine.

The reaction product remains dissolved and is separated from the precipitate of the ammonium halide. On cooling, the end product crystallizes out and can, if appropriate, be purified by recrystallization, reprecipitation or similar purification operations.

Compounds of the formula (17) wherein V and W denote alkyl radicals can also be manufactured by treating compounds of the formula (17), wherein V and W denote hydrogen atoms, with alkylating agents, for example diazoalkanes such as diazomethane, alkyl halides such as methyl iodide, or dialkyl sulphates such as dimethyl sulphate.

Compounds of the formula (17) wherein X and Y denote polyhalogenated ethyl or vinyl radicals can also be obtained by treating compounds of the formula (17), wherein X and Y denote vinyl groups, with halogen, preferably chlorine or bromine, in an organic solvent such as glacial acetic acid or acetonitrile.

Preferred new compounds which can be used according to the invention correspond to the formulae

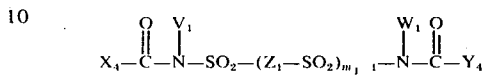

and

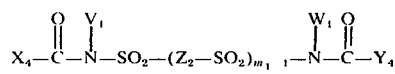

wherein $V_1$, $W_1$, $X_4$, $Y_4$, $Z_1$, $Z_2$ and $m_1$ have the abovementioned meanings.

The agents defined according to the invention can be used in the textile and leather industry, the manufacture of paper, and the plastics, glue and gelatine industry. Above all, they are used as hardeners for water-soluble polymers such as polyvinyl alcohol, gelatine or gelatine derivatives, especially in the form of layers of photographic materials which contain such colloids. The reaction of these colloids with these compounds in general takes place easily and in a known manner. The crosslinking agents are as a rule sufficiently water-soluble.

In most cases it suffices to add the products to be used according to the invention, as an aqueous solution or in a solid form which is as finely divided as possible, to an aqueous solution of the hydrophilic colloid, whilst stirring well.

It is thus possible, for example, to bring together a solution of the crosslinking agent in water, which can however also be mixed with, for example, ethanol, methanol or acetone, with the colloids at normal or slightly elevated temperature. The crosslinking then takes place rapidly and to a progressive extent.

Gelatine which optionally contains silver halide and/or other materials for the production of photographic images has proved particularly suitable. This gelatine can, in the usual manner, be cast onto a substrate to form a layer and can be dried. The layer can then be left at elevated temperature for a certain time, for example up to 24 hours, or be left at room temperature. Hereupon, hardening takes place rapidly and to a progressive extent; the melting point of the gelatine is substantially raised, for example by 25° to 60°C, and the reciprocal swelling factor increases correspondingly (compare Table II).

The amount of the hardener used depends on the desired degree of hardening but is appropriately 0.1 to 10 per cent by weight relative to the weight of dry gelatine.

A particular advantage of the present crosslinking agents is that, when used in a low concentration, they impart a sufficient degree of hardness to the gelatine layers already, for example, after 18 to 24 hours, so that the castings can be tested, by processing a sample, immediately following manufacture, even at elevated temperature or in chemically agressive processing baths. Furthermore, it is an advantage that no substantial change of pH in the emulsion layer occurs on hardening according to the invention with the compounds of the formula (1).

The hardening effect itself is very stable; even after prolonged storage at temperatures of around 40°C and a relative atmospheric humidity of about 70% the reciprocal swelling factor remains greater than 0.2.

The degree of hardening is also not changed significantly by acids or bases, even on prolonged action, which indicates that the hardener-gelatine bond is very resistant to hydrolysis.

The compounds of the formula (1) are furthermore generally readily soluble in water and sufficiently stable or even very stable in aqueous solutions.

The stability to hydrolysis, especially of the diacryloyl compounds which are not N-alkylated, is very great compared to the corresponding urea derivatives (compare French Pat. No. 1,524,588).

It is possible to vary the reactivity of the compounds by changing the pH value and thus to control the speed of hardening. A suitable choice of the substituents on the vinyl radicals has the same effect. The adequate stability and solubility are both particularly important properties on which, for example, the usability of the compounds in photographic technology depends to a decisive extent. Thus, for example, it is particularly desirable for the continuous manufacture of photographic materials that batches of solutions of crosslinking agents should remain stable for several hours or days at room temperature and that the concentration of the hardener for gelatine, and hence its crosslinking capacity, should not decrease or should only do so insignificantly. On the other hand it is equally important that the hardener, for the same reason, does not decompose or only decomposes insignificantly, in the casting solution at about 40°C over the course of the requisite dwell time, so as to maintain for several hours its full crosslinking action during casting, drying and storage of the photographic material.

Furthermore, the viscosity of the casting solution should not increase substantially during the dwell time as a result of the addition of the hardener. Furthermore, it is particularly important that even on prolonged treatment of the cast layer at elevated temperature and atmospheric humidity the hardener should not cause any yellowing, fogging or effect on the gradation.

The compounds of the formula (1) in most cases conform to these strict requirements, because of their stability to hydrolysis. The requirements are in any case fulfilled if, in aqueous solution at 40°C, the time for half the compound to decompose is at least 8, but preferably at least 12, hours.

The hardeners are suitable for hardening (crosslinking) the most diverse layers containing gelatine, such as, for example, intermediate layers, emulsion layers, base layers, coating layers, packing layers and antihalation layers. In addition to the crosslinking agents, the layers can also contain additives of the most diverse kind such as, for example, silver halide, pigments, such as barium sulphate, titanium dioxide, silicon dioxide or pigments of organic nature, such as pigment dyestuffs, as well as image dyestuffs, colour coupling agents, sensitisers, filters, anti-halation dyestuffs and screening dyestuffs, stabilisers, UV-absorbers, optical brighteners and/or other crosslinking agents.

In the case of the compounds of relatively low molecular weight it is possible, because of their good ability to diffuse in a multi-layer material, to add them only to the auxiliary layers in order to achieve, through diffusion, a hardening of the adjacent silver halide layers. However, with increasing molecular weight comparable compounds show decreasing diffusion when used in photographic layers. In the manufacture of multi-layer materials, this property offers decisive advantages in several respects.

These new crosslinking agents can also be used as a mixture with other compounds suitable for crosslinking watersoluble colloids, especially gelatine.

The new compounds of the formula (17) can also be converted, by themselves or together with other ethylenically unsaturated compounds, into water-soluble to hydrophilic polymers.

There follow some manufacturing instructions for compounds of the formula (1):

METHOD A 0.3 mol of antimony pentachloride is added to 0.1 mol of sulphuric acid diamide in 1.1 mols of 3-chloropropionyl chloride and the suspension is warmed to 70° – 80°C. Hereupon, hydrogen chloride gas is evolved copiously, and the mixture turns pale yellowish. As soon as the evolution of gas has ceased, the mixture is cooled to room temperature and filtered. The residue is thoroughly washed with benzine and dried at 60°C.

Practically pure N,N'-bis-3-chloropropionylsulphuric acid diamide of melting point 160°C, which can be purified further by recrystallisation, is thus obtained.

The compounds marked "Method A" in Table I can be manufactured analogously by reaction of the amides with appropriate acid halides. The structure of the compounds is confirmed by spectral data.

METHOD B

Diazomethane solution is added to a suspension of 2.77 g (0.01 mol) of N,N'-bis-(3-chloropropionyl)-sulphuric acid diamide until the yellow colouration persists and all the material has dissolved. The excess diazomethane is destroyed with a little glacial acetic acid and the mixture is evaporated in vacuo.

N,N'-bis-(3-chloropropionyl-N,N'-dimethylsulphuric acid diamide of melting point 96°C is obtained.

METHOD C 3.52 g (0.022 mol) of bromine in 10 ml of glacial acetic acid are added to the solution of 2.36 g (0.01 mol) of N,N'-bisacryloylsulphuric acid diamide (obtained according to Method D) in 20 ml of glacial acetic acid at 10°C. After the addition, the mixture is left for 30 minutes at 30°C to finish reacting, and is concentrated in vacuo. The reaction product is N,N'-bis-(2,3-dibromopropionyl)-sulphuric acid diamide of melting point 180°C.

The compounds mentioned under Method C in Table I can be manufactured analogously. The structure of these compounds is confirmed by spectral data.

METHOD D 60 g (0.208 mol) of N,N'-bis-(3-chloropropionyl)-sulphuric acid diamide are dissolved in 1 l of absolute acetone. 100 g (0.99 mol) of absolutle triethylamine are added over the course of 15 minutes from a dropping funnel. The mixture is stirred at room temperature until no further precipitate forms and is filtered. The filtrate is concentrated until crystallisation commences. It is then allowed to complete crystallisation at 10°C and after filtration, washing with absolute ether and drying N,N'-bis-acryloyl-(sulphuric acid diamide)

mono-triethylamminium salt of melting pont 104°C is obtained. This can be purified further by recrystallisation or can be obtained as free N,N'-bis-acryloyl-sulphuric acid diamide by dissolving in water and acidifying with hydrochloric acid.

The compounds marked D in Table I can be manufactured analogously by Method D. The structure of these compounds is confirmed by spectral data.

1 hour at 20°C. The dyestuff merely serves to make the samples more readily visible during the swelling measurements. Storage takes place under ambient conditions (NA, 20°C, 50% relative atmospheric humidity) or climatic conditions (CA, 43°C, 69% relative atmospheric humidity).

To determine the reciprocal swelling factor, a 20μ thick section is produced from the samples and mea-

TABLE I $$\underset{X-\overset{\overset{O}{\|}}{C}-\overset{\overset{V}{|}}{N}-SO_2-(Z-SO_2)_{m-1}-\overset{\overset{W}{|}}{N}-\overset{\overset{O}{\|}}{C}-Y}{}$$

| No. | X— | —Y | —Z— | —V | —W | m | Method | Melting Point °C |
|---|---|---|---|---|---|---|---|---|
| 1 | Cl—CH₂—CH₂— | —CH₂CH₂—Cl | — | —H | —H | 1 | A | 160 |
| 2 | Cl—CH₂CH₂— | —CH₂CH₂—Cl | — | —CH₃ | —CH₃ | 1 | B | 96 |
| 3 | Cl—CH₂—CH₂— | —CH₂CH₂—Cl | —(CH₂)₃— | —H | —H | 2 | A | 187 |
| 4 | Cl—CH₂CH₂— | —CH₂CH₂—Cl |  | —H | —H | 2 | A | 214 |
| 5 | Cl—CH₂CH₂— | —CH₂CH₂—Cl | 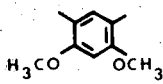 | —H | —H | 2 | A | 222 |
| 6 | Cl—CH₂CH₂— | —CH₂CH₂—Cl |  | —H | —H | 2 | A ω | 224 |
| 7 | Br—CH₂CHBr— | —CHBrCH₂Br | — | —H | —H | 1 | C | 180 |
| 8 | Cl—CH₂CHCl— | —CHCl—CH₂Cl | — | —H | —H | 1 | C | 130 |
| 9 | CH₂=CH— | —CH=CH₂ | — | —H | —H | 1 | D | 175 |
| 10 | CH₂=CH— | —CH=CH₂ | — | (C₂H₅)₃N⁺H | —H | 1 | D | 104 |
| 11 | CH₂=CH— | —CH=CH₂ | —(CH₂)₃ | —H | —H | 2 | D | 195 |
| 12 | CH₂=CH— | —CH=CH₂ |  | —H | —H | 2 | D | 186 |
| 13 | CH₂=CH— | —CH=CH₂ | 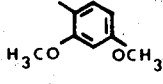 | —H | —H | 2 | D | 219 |
| 14 | CH₂=CH— | —CH=CH₂ | — | —CH₃ | —CH₃ | 1 | D | 23 |
| 15 | CH₂=CH | —CH=CH₂ |  | —H | —H | 2 | D | 255 |
| 16 | CH₂=CBr— | —CBr=CH₂ | — | —H | —H | 1 | D | 120 |
| 17 | CH₂—CCl | —CCl=CH₂ | — | —H | —H | 1 | D | 144 |

EXAMPLE

Mixtures of the following composition are manufactured with the crosslinking agents Nos. 1 to 17:
  6 ml of a 6% strength aqueous gelatine solution
  1 ml of a 1% strength aqueous dyestuff solution
  1 ml of 0.0025 molar aqueous solution of the crosslinking agent
  5 ml of deionised water.

The solution is brought to the pH value indicated in Table II.

The solution is cast on a 13 cm × 18 cm triacetate film. After solidifying at 10°C, it is dried over the course of sured under a microscope. For this purpose, the thickness of the dry layer is determined, deionised water is then added and after 4 minutes the thickness of the swollen layer is measured. The reciprocal swelling 1/SF corresponds to the following ratio $$1/SF = \frac{\text{Thickness of the dry layer}}{\text{Thickness of the swollen layer}}$$

The values which were determined in this way with the crosslinking agents Nos. 1 to 17 are summarised in Table II.

TABLE II

| No. | pH of the casting solution | 3 hours' drying | Reciprocal Swelling Factor | | | | | | | |
|---|---|---|---|---|---|---|---|---|---|---|
| | | | Storage time 2 days | | Storage time 7 days | | Storage time 14 days | | Storage time 28 days | |
| | | | 22°C, 50% RH | 43°C, 61% RH | 22°C, 50% RH | 43°C, 69% RH | 22°C, 50% RH | 43°C, 50% RH | 22°C, 50% RH | 43°C, 69% RH |
| 1 | 6.5 | 0.05 | | | 0.075 | 0.358 | 0.092 | 0.352 | 0.139 | 0.392 |
| 2 | 6.5 | 0.097 | 0.112 | 0.166 | 0.124 | 0.167 | | | | |
| 3 | 6.5 | 0.05 | 0.079 | 0.206 | 0.088 | 0.314 | | | | |
| 4 | 6.5 | 0.05 | 0.051 | 0.078 | 0.051 | 0.190 | | | | |
| 5 | 6.5 | 0.059 | 0.067 | 0.197 | 0.063 | 0.310 | 0.102 | 0.297 | 0.129 | 0.349 |
| 6 | 6.5 | 0.084 | 0.086 | 0.254 | 0.122 | 0.286 | | | | |
| 7 | 6.5 | 0.075 | 0.107 | 0.334 | 0.153 | 0.310 | 0.192 | 0.306 | 0.227 | 0.361 |
| 8 | 6.5 | 0.094 | 0.115 | 0.303 | 0.150 | 0.319 | | | | |
| 9 | 6.5 | 0.084 | 0.109 | 0.317 | 0.163 | 0.361 | 0.215 | | | |
| 10 | 4.5 | 0.122 | 0.106 | 0.230 | 0.134 | 0.358 | | | | |
| | 5.5 | 0.05 | 10.085 | 0.253 | 0.100 | 0.344 | | | | |
| | 6.5 | 0.062 | 0.096 | 0.325 | 0.125 | 0.312 | | | | |
| | 8.0 | 0.100 | 0.170 | 0.381 | 0.238 | 0.363 | 0.253 | 0.358 | 0.296 | 0.336 |
| 11 | 6.5 | 0.058 | 0.074 | 0.236 | 0.077 | 0.314 | | | | |
| 12 | 6.5 | 0.088 | 0.073 | 0.200 | 0.117 | 0.297 | | | | |
| 13 | 6.5 | 0.093 | 0.073 | 0.123 | 0.711 | 0.223 | | | | |
| 14 | 6.5 | 0.113 | 0.125 | 0.166 | 0.136 | 0.175 | | | | |
| 15 | 6.5 | 0.076 | 0.087 | 0.248 | 0.116 | 0.280 | | | | |
| 16 | 6.5 | 0.077 | 0.107 | 0.270 | 0.134 | 0.309 | 0.167 | 0.305 | 0.200 | 0.300 |
| 17 | 6.5 | 0.060 | 0.099 | 0.280 | 0.133 | 0.326 | 0.167 | 0.313 | 0.209 | 0.305 |

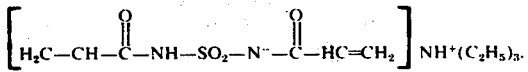

What I claim is:

1. Process for crosslinking hydrophilic colloids which contain amino-, imino- and/or hydroxyl groups, which process comprises employing as crosslinking agent a compound of the formula

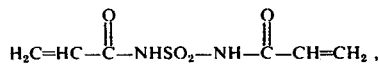

or a salt of such compound, formed with one equivalent of an amine.

2. Process according to claim 1, characterised in that gelatine or polyvinyl alcohol, are crosslinked.

3. Process according to claim 1, characterized in that gelatine, is crosslinked.

4. Process according to claim 1, characterised in that compounds of which the time for halfdecomposition in aqueous solution at 40°C is at least 8 hours, are used as crosslinking agents.

5. Process for crosslinking hydrophilic colloids which contain amino-, imino- and/or hydroxyl groups which comprises employing as the crosslinking agent the amine salt of the formula